(12) United States Patent
Crable et al.

(10) Patent No.: US 10,599,985 B2
(45) Date of Patent: Mar. 24, 2020

(54) SYSTEMS AND METHODS FOR EXPEDITING RULE-BASED DATA PROCESSING

(71) Applicant: CAPITAL ONE SERVICES, LLC, McLean, VA (US)

(72) Inventors: Fredrick A. Crable, Allen, TX (US); Hala S. El-Ali, Murphy, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 111 days.

(21) Appl. No.: 15/693,994

(22) Filed: Sep. 1, 2017

(65) Prior Publication Data

US 2019/0073599 A1 Mar. 7, 2019

(51) Int. Cl.
*G06F 15/18* (2006.01)
*G06N 5/04* (2006.01)
*G06Q 40/02* (2012.01)
*G06F 16/901* (2019.01)

(52) U.S. Cl.
CPC ......... *G06N 5/046* (2013.01); *G06F 16/9027* (2019.01); *G06Q 40/025* (2013.01)

(58) Field of Classification Search
USPC .............................................. 706/15, 45, 47
See application file for complete search history.

(56) References Cited

U.S. PATENT DOCUMENTS

| 6,385,608 | B1* | 5/2002 | Mitsuishi | G06F 17/18 |
| 2005/0273517 | A1* | 12/2005 | Patrick | H04L 63/20 |
| | | | | 709/238 |
| 2005/0278362 | A1* | 12/2005 | Maren | G06F 17/30943 |
| 2007/0044539 | A1* | 3/2007 | Sabol | G06Q 10/06 |
| | | | | 73/19.01 |

(Continued)

FOREIGN PATENT DOCUMENTS

| CN | 104050267 A | * | 9/2014 | ............ G06F 17/30 |
| WO | 2011098677 A1 | | 8/2011 | |

OTHER PUBLICATIONS

Manku, et al., "Approximate Frequency Counts over Data Streams," 12 pages, Proceedings of the 28th VLDB Conference, Hong Kong, China, 2002.*

(Continued)

*Primary Examiner* — David R Vincent
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method for generating a data tree structure for expediting rule-based decision-making. The system may receive a rules file having a plurality of rules, where each rule has one or more conditions and one or more actions. The system may generate a plurality of condition frequency counts that represent the total number of rules having a condition of a particular unique condition type. The system may then generate a tree (Continued)

structure based on the plurality of rules and the plurality of condition frequency counts, where the tree structure includes a root node and one or more node branches, where each node branch includes a first-level node and zero or more second-level nodes that each include a node condition and zero or more node actions.

15 Claims, 7 Drawing Sheets

(56) References Cited

U.S. PATENT DOCUMENTS

| | | | |
|---|---|---|---|
| 2009/0157586 A1* | 6/2009 | Zhang | G06N 5/025 706/47 |
| 2009/0197582 A1* | 8/2009 | Lewis | H04W 4/02 455/414.2 |
| 2009/0287628 A1* | 11/2009 | Indeck | G06N 5/025 706/47 |
| 2011/0098056 A1* | 4/2011 | Rhoads | G01C 21/20 455/456.1 |
| 2011/0161076 A1* | 6/2011 | Davis | G06F 3/04842 704/231 |
| 2011/0244919 A1* | 10/2011 | Aller | G06K 9/00973 455/556.1 |
| 2014/0095778 A1* | 4/2014 | Chung | G06F 12/0246 711/104 |
| 2014/0235456 A1* | 8/2014 | Garner, Jr. | C12Q 1/6886 506/2 |
| 2016/0092929 A1 | 3/2016 | Huang et al. | |

OTHER PUBLICATIONS

Extended European Search Report in related EP Application No. 18191400.3, dated Oct. 30, 2018.

* cited by examiner

SYSTEMS AND METHODS FOR EXPEDITING RULE-BASED DATA PROCESSING

FIELD OF INVENTION

The present disclosure relates to systems and methods for expediting rule-based data processing, and more particularly providing systems and methods for expediting rule-based decision-making utilizing a data tree structure.

BACKGROUND

Companies often make business decisions in accordance with a set of ever-changing rules that are created by employees of the company over time. For example, decisions relating to whether or not to approve a customer for a car loan and what the terms of the loan should be may turn on a variety of different factors such as the customer's income, net worth, credit score, available down payment, value of car, amount of the loan, type of loan being sought, and other such considerations and the company may have established a set of rules to help make such decisions. One exemplary rule might be, if a customer's credit score is below 500, then a minimum down payment of 20% is required. When a customer submits a loan application form, the rules may be applied to the customer's data to make determinations about whether to approve the loan and what the terms should be.

In order to implement an automated system of rules processing, it is desirable to store the rules in a file that is independent from the rules-processing engine so that changes to the rules can be made without having the redeploy the code. Further, storing the rules in a separate file may allow employees to easily access and modify the rules in a format that does not require any sophisticated programming knowledge. However, in some cases, organizations may have rules models that include a large number (e.g., millions) of rules which can cause the rules engine to take an undesirably long amount of time to load and process. Further, this process can monopolize a company's resources by requiring a lot of memory to execute.

Accordingly, there is a need for improved systems and methods to provide a rule-based processing engine or device that can process a large number of rules and input requests to generate decisions in a fashion that produces faster results and utilizes less memory. Embodiments of the present disclosure are directed to this and other considerations.

SUMMARY

Disclosed embodiments provide systems and methods for expediting rule-based decision-making utilizing a data tree structure.

Consistent with the disclosed embodiments, the system may include one or more memory devices storing instructions, and one or more processors configured to execute the instructions to perform steps of a method of generating a data tree structure for expediting rule-based decision-making. The system may execute the instructions to receive a rules file comprising a plurality of rules, where each rule of the plurality of rules includes one or more conditions and one or more actions and each condition is associated with a condition type. The system may generate a plurality of condition frequency counts in response to reading the rules file. Each of the plurality of condition counts may be associated with a unique condition type and each condition frequency count may represent the total number of rules having a condition associated with the respective unique condition type. The system may generate a tree structure based on the plurality of rules and the plurality of condition frequency counts. The tree structure may include a root node and one or more node branches, where each node branch includes a first-level node and zero of more second-level nodes, and each of the first-level nodes and the zero or more second-level nodes include a node condition and zero or more node actions.

Consistent with the disclosed embodiments, methods and computer-readable media for expediting rule-based decision-making utilizing a data tree structure are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
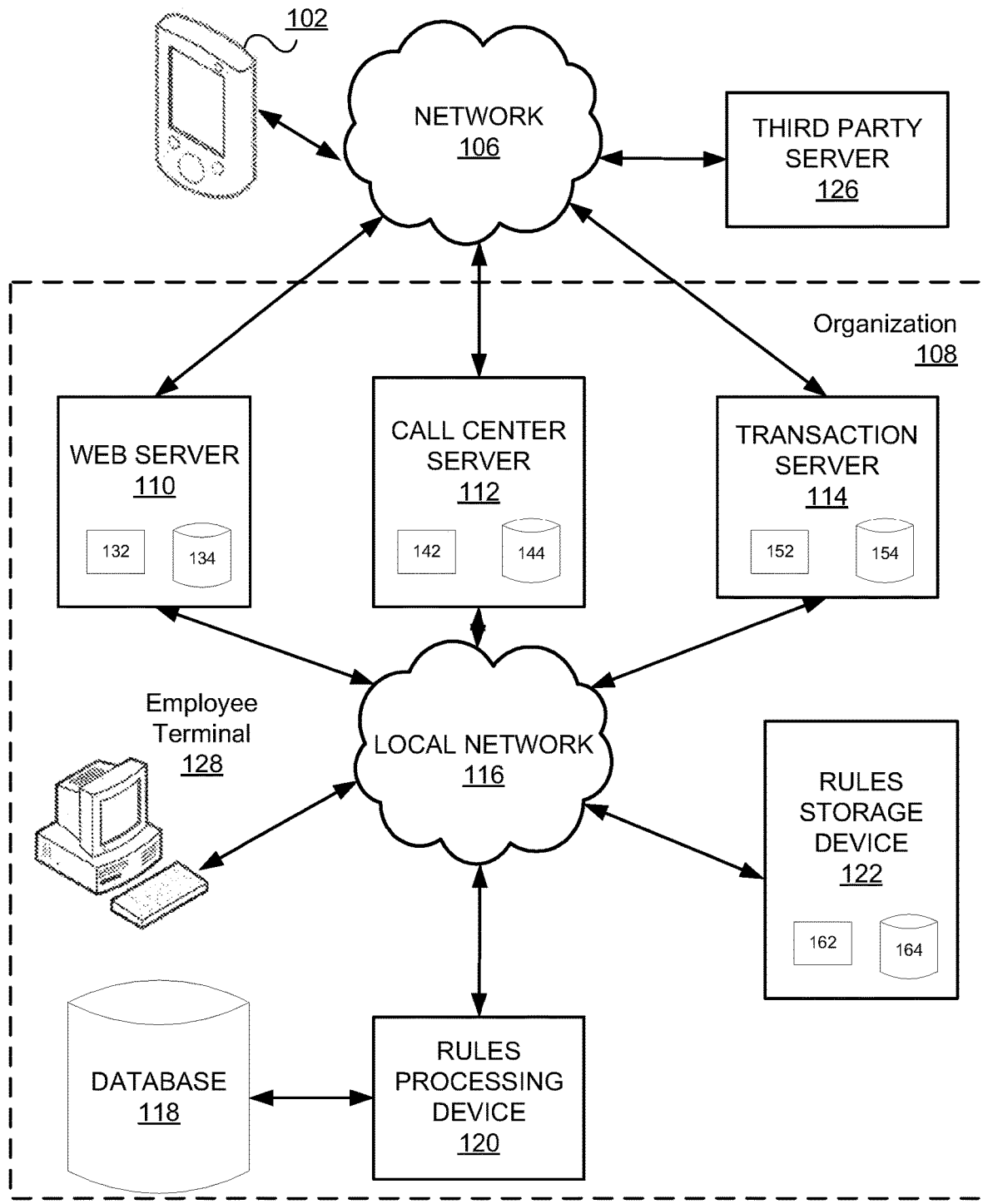
FIG. 1 is a diagram of an exemplary system for expediting rule-based data processing.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for generating a data tree structure for expediting rule-based decision-making. The system may include one or more memory devices storing instructions, and one or more processors configured to execute the instructions to perform steps of a method. Specifically, in some embodiments, the system may execute the instructions to a rules file comprising a plurality of rules, where each rule of the plurality of rules includes one or more conditions and one or more actions and each condition is associated with a condition type. The system may generate a plurality of condition frequency counts in response to reading the rules file. Each of the plurality of condition counts may be associated with a unique condition type and each condition frequency count may represent the total number of rules having a condition associated with the respective unique condition type. The system may generate a tree structure based on the plurality of rules and the plurality of condition frequency counts. The tree structure may include a root node and one or more node branches, where each node branch includes a first-level node and zero of more second-level nodes, and each of the first-level nodes and the zero or more second-level nodes include a node condition and zero or more node actions.

In another embodiment, a method for generating a data tree structure for expediting rule-based decision-making is disclosed. The method may include receiving a rules file comprising a plurality of rules, where each rule of the plurality of rules includes one or more conditions and one or more actions and each condition is associated with a condition type. The method may further include generating a plurality of condition frequency counts in response to reading the rules file. Each of the plurality of condition counts may be associated with a unique condition type and each condition frequency count may represent the total number of rules having a condition associated with the respective unique condition type. The method may further include generating a tree structure based on the plurality of rules and the plurality of condition frequency counts. The tree structure may include a root node and one or more node branches, where each node branch includes a first-level node and zero of more second-level nodes, and each of the first-level nodes and the zero or more second-level nodes include a node condition and zero or more node actions.

In another embodiment a non-transitory computer-readable medium is disclosed. The non-transitory computer-readable medium may store instructions that, when executed by one or more processors, cause a system to receive a rules file comprising a plurality of rules, where each rule of the plurality of rules includes one or more conditions and one or more actions and each condition is associated with a condition type. The system may generate a plurality of condition frequency counts in response to reading the rules file. Each of the plurality of condition counts may be associated with a unique condition type and each condition frequency count may represent the total number of rules having a condition associated with the respective unique condition type. The system may generate a tree structure based on the plurality of rules and the plurality of condition frequency counts. The tree structure may include a root node and one or more node branches, where each node branch includes a first-level node and zero of more second-level nodes, and each of the first-level nodes and the zero or more second-level nodes include a node condition and zero or more node actions.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more methods disclosed herein, including methods for processing high volumes of rules and methods for expediting rule-based data processing. The components and arrangements shown in FIG. 1 are not intended to limit the disclosed embodiments as the components used to implement the disclosed processes and features may vary. As shown, system 100 may include a user device 102, a network 106, a third party server 126, and an organization 108 including, for example, a web server 110, a call center server 112, a transaction server 114, a local network 116, a database 118, a rules processing device 120, a rules storage device 122, and an employee terminal 128.

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors. According to some embodiments, user device 102 may be utilized to generate data may be used to generate or populate an input request, such as for example, a loan application form.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers.

Organization 108 may include one or more servers, devices, and computer systems for performing one or more functions associated with products and/or services that organization 108 provides. Such servers, devices, and computer systems may include, for example, web server 110, call center server 112, transaction server 114, database 118, rules processing device 120, rules storage device 122, and one or more employee terminals 128, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., rules processing device 120) of system 100. According to some embodiments, web server 110 may host one or more editable forms, such as loan application forms, that may be filled out by a customer (e.g., via user device 102) to create an input request that may be processed by the system (e.g., by rules processing device 120). In some embodiments, web server 110 may receive an input request from, for example, user device 102, via email, FTP, instant messaging, or any other suitable method of transmitting information.

Call center server 112 may include a computer system configured to receive, process, and route telephone calls and other electronic communications with a customer operating user device 102. Call center server 112 may have one or more processors 142 and one or more call center databases 144, which may be any suitable repository of call center data. Information stored in call center server 112 may be accessed (e.g., retrieved, updated, and added to) via local network 116 and/or network 106 by one or more devices (e.g., rules processing device 120) of system 100. In some embodiments, call center server processor 142 may be used to implement an interactive voice response (IVR) system that interacts with the customer over the phone. In some embodiments, call center server 112 may generate an input request that may be processed by the system (e.g., via rules processing device 120) based on oral responses or statements made by a customer while interacting with call center server 112.

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices (e.g., rules processing device 120) of system 100. In some embodiments transaction server 114 may be accessed by another device of the system 100 (e.g., rules processing device 120) in response to supplement data included in an input request. For example, if a customer submits a loan application and fails to fill out a portion of the application that asks for information on credit card balances or monthly expenditures, rules processing device 120 may access data stored on transaction server 114 and may add information to the input request based on the data stored on transaction server 114.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, rules, products and services, lines of business, and other business operations. Database 118 may also serve as a back-up storage device and may contain data and information that is also stored on, for example, local databases associated with web server 110, call center server 112, transaction server 114, rules processing device 120, rules storage device 122, and employee terminal 128. Database 118 may be accessed by other devices (e.g., rules processing device 120) and may be used to store records of every interaction, communication, and/or transaction a particular customer has had with organization 108 and/or its related entity.

Rules processing device 120 may include a computer system configured to receive a rules file and generate a tree structure based on the rules file. A rules file may be a file that contains a plurality of rules. A rule may be a set of one or more conditions that, when all met, cause one or more associated actions to be executed. For example, a rule may be "if a customer salary >$70,000, than a minimum down payment of 3% is required." In this case, the condition is the minimum salary specified in the rule, and the action is the minimum down payment percentage that is required if that condition is met. The tree structure generated by rules processing device may be a hierarchy of singly linked nodes. Each node may have a node condition and zero or more node actions. The tree structure may have a root node and one or more node branches that are linked to the root node. A node branch may be a set of linked nodes that all have a first condition in common. In some embodiments, the top-level nodes of each node branch may be referred to as first-level nodes. A node branch may include sub-branches of linked nodes beneath the first node of the branch, where the nodes of the sub-branch all have a second condition in common. In some embodiments, the top-level nodes of each sub-branch may be referred to as second-level nodes. The tree structure may include any number of branches that have any number of sub-branches. Further, sub-branches may have their own sub-branches and those sub-branches may have their own sub-branches and so on.

Rules processing device 120 may be configured to receive an input request, such as a loan application form, and may process the request using the tree structure formed from the rules file. An input request may include data that represent input conditions that may be compared to a condition of a node to determine if the condition has been met or not. According to some embodiments, rules processing device 120 may perform a breadth-first traversal of the tree structure, meaning that it processes all of the nodes on the same level (e.g., all first-level nodes) before traversing to the nodes in the next level down. Accordingly, rules processing device 120 may begin processing the input request by beginning at the root node of the tree structure and traversing to the first-level nodes linked immediately below the root node and comparing the input conditions of the input request to the conditions of each first-level node. According to some embodiments, if rules processing device 120 determines that the condition of a particular first-level node is not met by the input conditions, then rules processing device 120 may eliminate the associated branch from further processing with respect to the input request. If rules processing device 120 determines that the condition of a particular first-second node is met by the input conditions, then rules processing device 120 may cause any node action associated with the first-level node to be executed, and rules processing device 120 may traverse down the branch to the second-level nodes after it is completed processing of all of the first-level nodes.

Upon traversing to the second-level nodes, rules processing device 120 may follow the same process of comparing the input conditions to each condition of each second-level node, eliminating sub-branches of nodes that have conditions that are not satisfied, executing node actions of nodes that have conditions that are satisfied, and then traversing down to third-level nodes that are linked to second-level nodes that have conditions that are satisfied by the input conditions. When rules processing device 120 traverses to a particle node, it may process the node by reading the node condition associated with the node and comparing it to the input conditions of the input request to determine if the node condition has been met. According to some embodiments, any time the rules processing device 120 determines that a node condition of a node is satisfied by the input conditions, it may cause any associated node action to be executed and may designate the branch or sub-branch beneath the node containing the satisfied condition as requiring future traversal by rules processing device 120. Rules processing device 120 may traverse down the remainder of the tree structure in this fashion, eliminating sub-branches in which node condition of the top node of the sub-branch is not satisfied and continuing to traverse down sub-branches in which the top node of the sub-branch is satisfied. In this way, rules processing device 120 may be very efficient in processing an input request because it only traverses branches of the tree structure that meet the input conditions of the input request while avoiding having to process branches and sub-branches that do not meet the input conditions of the input request. In some embodiments, when rules processing device 120 has concluded traversing the tree in this manner, rules processing device may generate output data representing the results of the executed node actions.

According to some embodiments, each node action may have an associated priority level so that if there are any conflicting executed node actions, the node actions with the highest priority will execute over conflicting node actions with lower priorities. Accordingly, in some embodiments, rules processing device 120 may complete its traversal of the tree before causing any particular node action to execute, but may rather mark node actions for future execution in response to the node conditions being met. Accordingly, in some embodiments, before executing any node actions, rules processing device 120 may first check to see if a particular node action attempts to modify the same variable as one or more other node actions that have been designated for execution, and if it does, rules processing device 120 may check the priorities of each node action and only execute the node action with the highest priority. Upon executing all of the node actions, rules processing device 120 may generate an output map representing all of the data generated by the executed node actions. According to some embodiments, an output map may be a map of key values that identify the actions that were invoked while matching conditions. For example, in one instance, an output map may specify that maxWarranty=2000, minAtf=4000, and minDP=1000.

Rules storage device 122 may include a computer system configured to store, manage, and update a rules file containing a plurality of rules. A rules file may store a large number (i.e., a high volume) of rules. For example, in some embodiments, a rules file may store millions of rules. As described above, each rule of a rules file may include one or more conditions and one or more actions. Each condition may have a condition type. For example, examples of condition types relating to a set of rules that may be used in assessing a loan application for a vehicle may be line-of-business (lob) in, a tier in, borrower minimum income, vehicle maximum age, vehicle maximum mileage, vehicle make, model or condition, vehicle book value, a version number or any other condition that may be relevant to assessing whether or not to issue a loan or under what circumstances. A line-of-business may represent the line-of-business that a loan application relates to (e.g., whether a loan application was received via a website, received via a dealer, or received from a third party or some other method). Further, in some embodiments, a line-of-business may segmented based on an associated credit score and/or other credit qualities of the borrower(s), such that lines of business may segmented by both origination and credit into, for example, dealer-prime, dealer-subprime, dealer-near-prime, etc. A tier in may represent a segment of business (e.g., sub-prime, near-prime, or prime credit tiers). According to some embodiments, there may be ten or more tiers that are assigned based on a borrower's credit history, employment status, bankruptcy history, and other such factors that may impact a borrower's creditworthiness. In some embodiments, tiers 0 through 4 may be considered to be prime, tiers 5 through 9 may be considered to be subprime, and tiers 5 to 6 may be considered to be near-prime. Accordingly, in some embodiments, a tier in may be any number from 0 to 9 that represents the tier value associated with a customer that may be, for example, applying for a loan. A version number may represent the version of the rules file that a rule was created in association with. It should be understood that these condition types are merely exemplary and although the previous example provides example condition types relating to assessing an application for a vehicle loan, there may be any number of different condition types based on the use case that the system is applied to.

A rules file may be a file format that is easily accessible and modifiable by employees with minimum training. For example, a rules file may be, without limitation, a CSV file, a spreadsheet file, or a database table. A rules file may be stored in a document management system of rules storage device 122 that is capable of storing and maintaining different versions of rules file. According to some embodiments, a rules file may be updated intermittently, and each updated version of a particular rules file may be given a new version number to track the version of the rules file.

Third party server 126 may include a computer system configured to store, manage, and update a rules file containing a plurality of rules. As shown in FIG. 1, third party server may be a computer system or device that may be positioned externally to organization 108 and may be accessed via network 106. For example, third party server may be a cloud storage system or device that allows a rules file to be accessed and updated from any device that is connected to network 106. In this way, employees and other users may be able to easily access and update a rules file without the need to access rules processing device 120. A rules file may be stored in a document management system of third party server 122 that is capable of storing and maintaining different versions of rules file.

Employee terminal 128 may be, but is not limited to a terminal, a desktop computer, a laptop computer, a mobile device such as a smart phone or tablet device, and any other computerized devices configured to communicate with local network 116 to perform various functions relating to organization 108 such as, for example, receiving and displaying data such as input requests and data output by rules processing device. Employee terminal 128 may enable an employee of an entity associated with organization 108 to access and modify a rules file stored on, for example, rules storage device. Employee terminal 128 may include functionality that enables an employee to initiate a transfer of a rules file to rules processing device 120 for loading and processing. Employee terminal 128 may further include functionality to enable an employee to direct an input request to be sent to rules processing device 120 for processing.

Although the preceding description describes various functions of web server 110, call center server 112, transaction server 114, database 118, rules processing device 120, rules storage device 122, third party server 126, and employee terminal 128 in some embodiments, some or all of these functions may be carried out by a single computing device.

For ease of discussion, embodiments may be described in connection with the expediting rule-based data processing in relation to a loan application process. It is to be understood, however, that disclosed embodiments are not limited to processing loan applications, but may relate to any context where rules are applied to input to determine an output, such as any type of underwriting (e.g., mortgage, insurance, etc.), reservation systems, customer suggestion systems, or any other context in which processing a set of input data through a large number of rules to generate an output may be useful. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
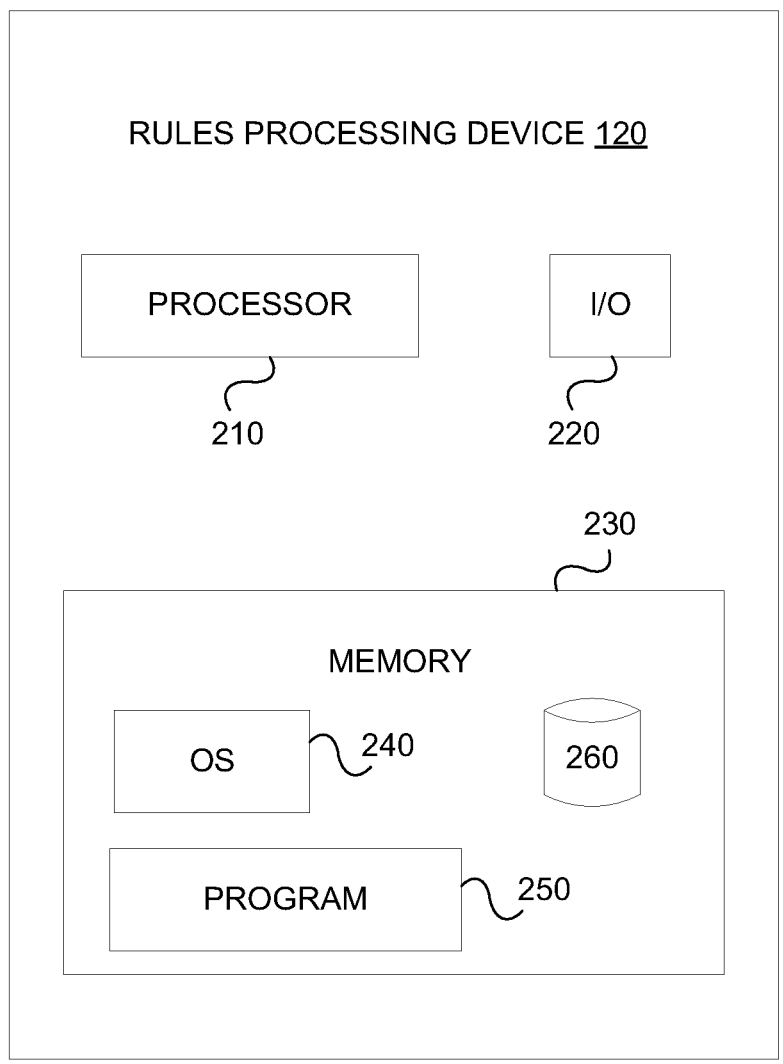
FIG. 2 is a component diagram of an exemplary rules processing device.

An exemplary embodiment of rules processing device 120 is shown in more detail in FIG. 2. Web server 110, call center server 112, transaction server 114, rules storage device 122, third party server 126, employee terminal 128 and/or user device 102 may have a similar structure and may include many components that are similar to or even have the same capabilities as those described with respect to rules processing device 120. As shown, rules processing device 120 may include a processor 210, an input/output ("I/O") device 220, a memory 230 containing an operating system ("OS") 240 and a program 250. For example, rules processing device 120 may be a single device or server or may be configured as a distributed computer system including multiple servers, devices, or computers that interoperate to perform one or more of the processes and functionalities associated with the disclosed embodiments. In some embodiments, rules processing device 120 may further include a peripheral interface, a transceiver, a mobile network interface in communication with the processor 210, a bus configured to facilitate communication between the various components of the rules processing device 120, and a power source configured to power one or more components of the rules processing device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Rules processing device 120 may include one or more storage devices configured to store information used by processor 210 (or other components) to perform certain functions related to the disclosed embodiments. In some embodiments, rules processing device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, rules processing device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, rules processing device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, rules processing device 120 may include a tree structure generation program 250 that is a program configured to convert a plurality of rules that are provided in a rules file into a tree structure that may be traversed in accordance with an input request to generate executed actions as described below.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable rules processing device 120 to perform one or more of the processes and functionalities associated with the disclosed embodiments.

Rules processing device 120 may also be communicatively connected to one or more memory devices (e.g., databases) locally or through a network. The remote memory devices may be configured to store information and may be accessed and/or managed by rules processing device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Rules processing device 120 may also include one or more I/O devices 220 that may comprise one or more interfaces for receiving signals or input from devices and providing signals or output to one or more devices that allow data to be received and/or transmitted rules processing device 120. For example, rules processing device 120 may include interface components, which may provide interfaces to one or more input devices, such as one or more keyboards, mouse devices, touch screens, track pads, trackballs, scroll wheels, digital cameras, microphones, sensors, and the like, that enable rules processing device 120 to receive data from one or more users (such as, for example, via user device 102).

In exemplary embodiments of the disclosed technology, rules processing device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, rules processing device 120, rules storage device 122, third party server 126, employee terminal 128, and user device 102 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, call center server 112, transaction server 114, rules processing device 120, rules storage device 122, third party server 126, employee terminal 128, and user device 102 may include a greater or lesser number of components than those illustrated.

Figure 5:
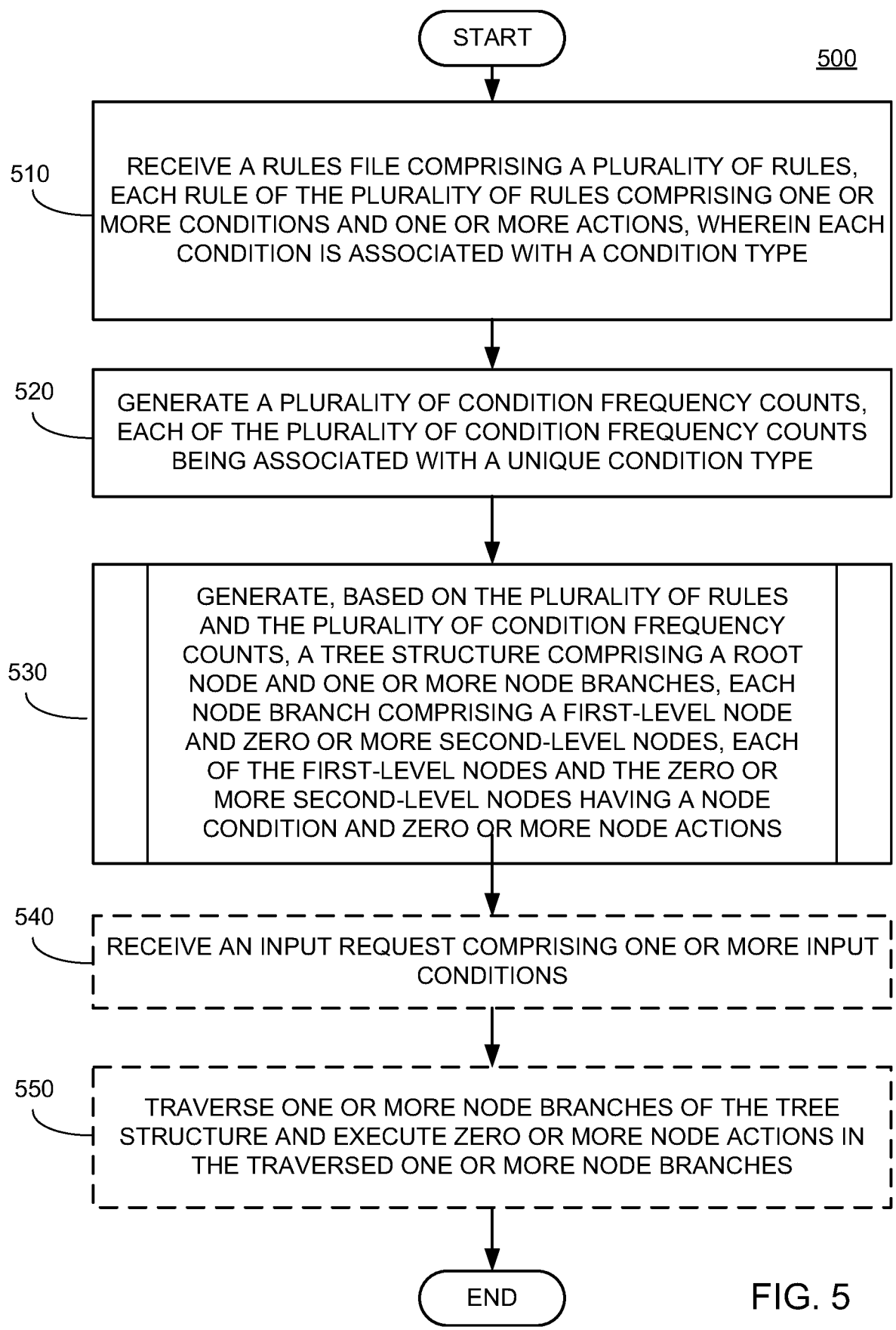
FIG. 5 is a flowchart of an exemplary system for expediting rule-based data processing.

FIG. 5 shows a flowchart of an exemplary method 500 for expediting rule-based data processing. Method 500 may be performed by some or all of web server 110, call center server 112, transaction server 114, database 118, rules processing device 120, rules storage device 122, third party server 126, employee terminal 128, and user device 102.

Figure 3:
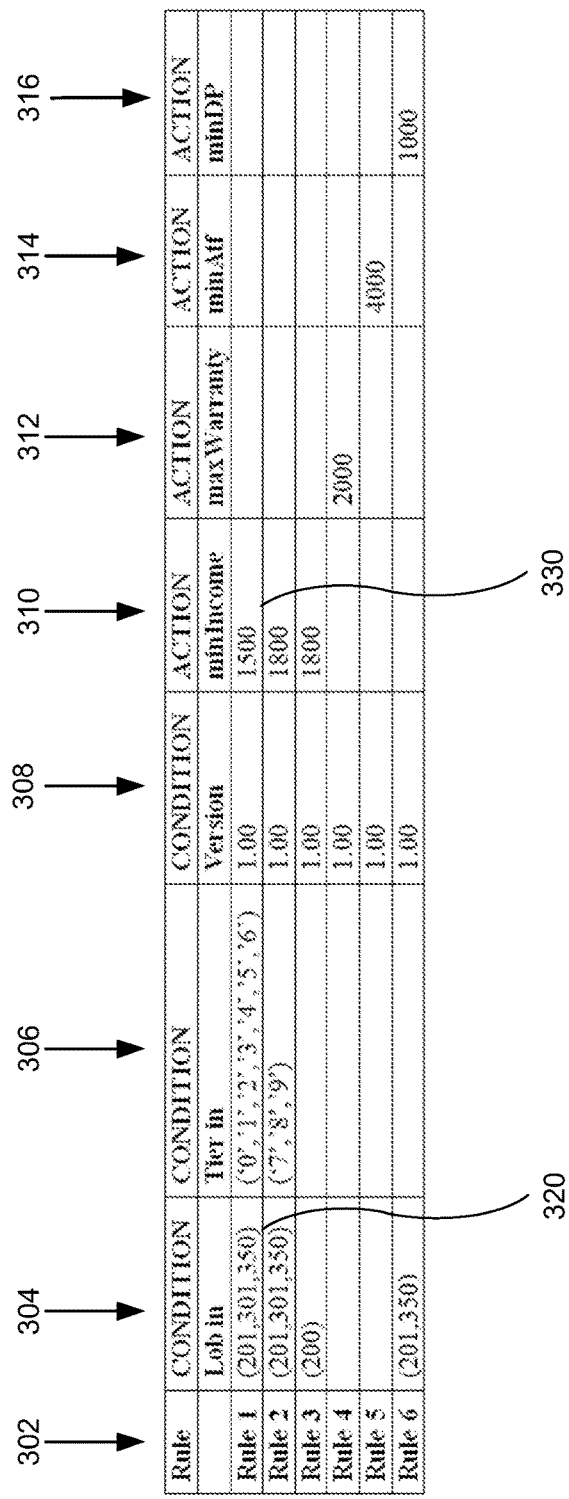
FIG. 3 is an exemplary rules file for use by a system for expediting rule-based data processing.

In block 510, rules processing device 120 may receive a rules file (e.g., a rules file 300 as shown in FIG. 3) that includes a plurality of rules. Each rule of the plurality of rules may include one or more conditions and one or more actions. According to some embodiments, each condition may be associated with a condition type. As shown in the exemplary embodiment in FIG. 3, rules file 300 may be in the form of a table that has a plurality of rows and a plurality of columns. According to some embodiments, each row may represent a single rule, as indicated by the rule name column 302. In the example shown in FIG. 3, there are six rules, and each rule includes up to three condition types and up to four actions. The three possible condition types correspond to the "Lob in" column 304 that indicates a particular line of business, the "Tier in" column 306 that indicates a particular tier, and a "Version" column 308 that indicates the version of the rules file associated with the rule. The four possible actions correspond to the "minIncome" column 310 that specifies a minimum income, the "maxWarranty" column 312 that specifies a maximum warranty, a "minAtf" column 314 that specifies a minimum amount to finance, and a "minDP" column 316 that specifies a minimum down payment. According to some embodiments, if a condition field or an action field of a particular rule is blank, rules processing device 120 may determine that it does have a condition or an action associated with the condition type or action type that associated with the respective field.

A field that is positioned at the intersection of a row of a rule and a column of a condition type may specify a condition that must be satisfied to meet the rule. For example, the field 320 in the Lob in column 304 of the Rule 1 row specifies a condition that the line of business of an input request must be one of "201," "301," or "350" in order to meet the condition. According to some embodiments, conditions may be input as a parenthetical list of possible data entries that would satisfy the condition, Boolean operations, or mathematical operations. Examples of conditions may be "tier is {'0', '1', '2'}" which is satisfied if the tier input is any of "0", "1", or "2", or "minIncome is {>1000}" which is satisfied if the corresponding income input is greater than 1000. According to some embodiments, conditions may utilize one or more of $>$, $<$, $>=$, $<=$, $!=$, $=$. Further, in some embodiments, conditions may include dates and/or times (including ranges) that may be compared against input data, or may include condition data that may be compared against input data to determine if the input data contains or includes the condition data or vice versa. Each field that is located at the intersection of a row of a rule and a column of an action may specify the action to be executed by the system if all of the conditions of the applicable rule are met. For example, field 330 in the minIncome column 310 of the Rule 1 row specifies an output value for a minimum income that is 1500. Accordingly, in the example embodiment shown in FIG. 3, if the conditions associated with Rule 1 are all met, then rules processing device 120 may cause the action to be executed, thereby outputting "1500" as a minimum income value.

According to some embodiments, rules processing device 120 may convert the conditions and actions to an expected data type to avoid the need to convert data during the processing phase. For example, a numeric value may be of different types such as Integer (i.e., whole numbers) vs. Double (i.e., high precision float numbers), and to compare two values in a given computer programming language, it may be necessary to convert the data to the same data type. For example, a condition may be "minIncome <1800" meaning that the minimum income is less than $1800/month and because 1800 is a whole number, the system may store the 1800 as an Integer type. However, if the reported income in a loan application (i.e., the input data) is $1825.40, this number may be stored as a Double type because it is a decimal number. Thus, in this example, it would be necessary to convert the 1800 from an Integer type to a Double type prior to running the comparison between the two. If this conversion takes place during traversal of the tree structure, it would be necessary to perform the conversion every time the tree is traversed and therefore the conversion would be very costly in terms of high processing volume. Accordingly, to reduce the processing cost, it may be advantageous to convert the conditions and actions to an expected data type to avoid having to convert them during processing of the rules tree. Thus, in some embodiments, each condition and action data may be converted to an expected data type prior to the traversal of the tree structure. An expected data type may be determined by, for example, referencing a table of expected data types that specifies what the expected data type for each condition and action should be and converting each condition or action data to the associated expected data type. As described above, according to some embodiments, this conversion of conditions and actions to an expected data type may occur only once at during the loading of the tree in memory, as opposed to performing the conversion each time the tree is traversed.

In block 520, rules processing device 120 may generate a plurality of condition frequency counts. According to some embodiments, the plurality of condition frequency counts may be generated in response to reading the rules file 300 and counting the number of rules having a condition in a field that is associated with a particular condition type. According to some embodiments, rules processing device 120 may generate a condition frequency count for each unique condition type. According to some embodiments, in the course of generating the plurality of condition frequency counts, rule processing device 120 may ignore blank fields in the condition columns (e.g., columns 304, 306, 308) and only count fields that contain a condition. For example, as shown in the exemplary embodiment in FIG. 3, Rules 1, 2, 3, and 6 each specify conditions in the Lob in column 304 and thus the "Lob in" condition type may have a condition frequency count of four. Similarly, the "Tier in" condition type may have a condition frequency count of two and the "Version" condition type may have a condition frequency of six.

Figure 4:
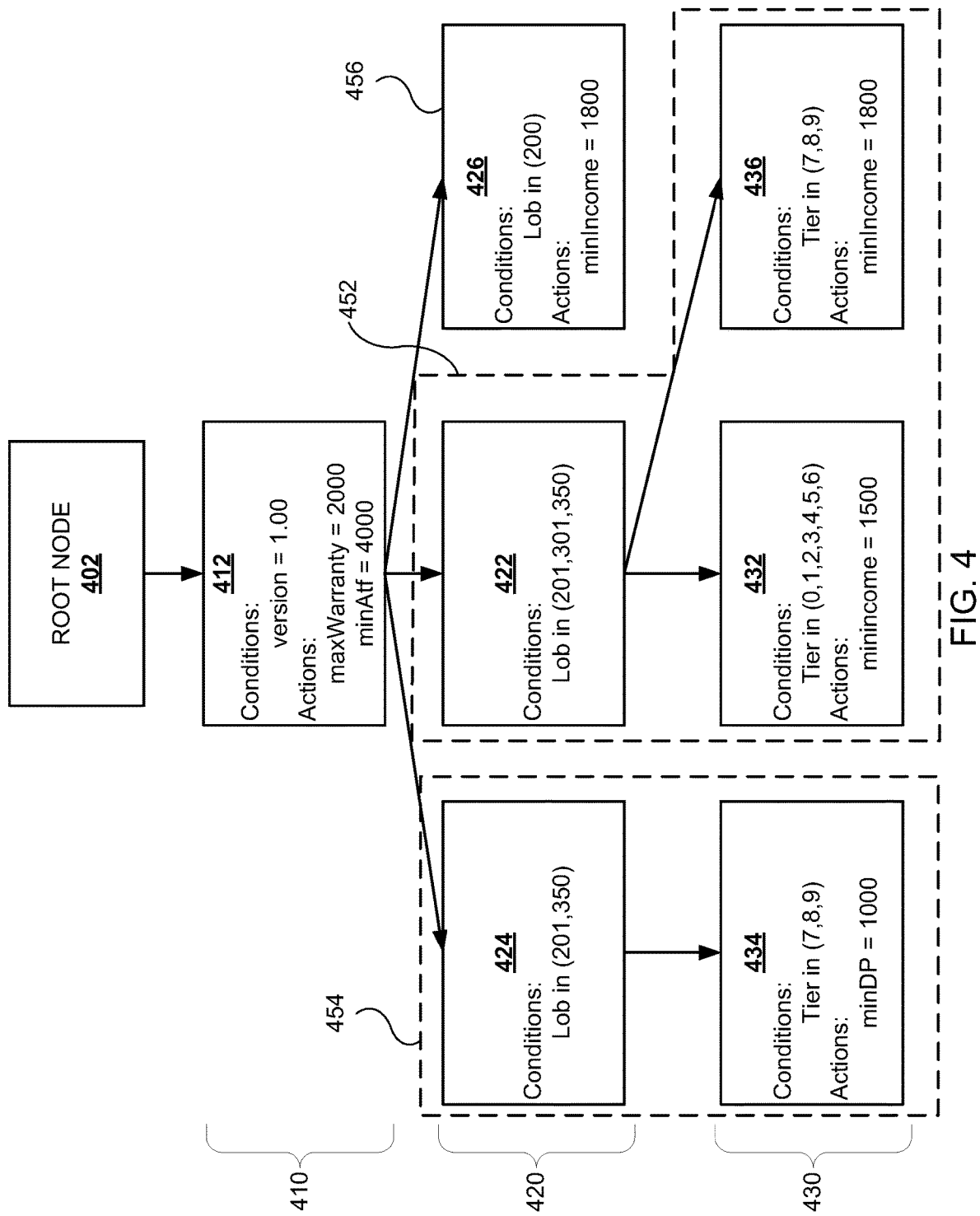
FIG. 4 is an exemplary tree structure generated by a system for expediting rule-based data processing.

In block 530, rules processing device 120 may generate a tree structure (e.g., a tree structure 400 as shown in FIG. 4). The tree structure generated by rules processing device 120 may include a root node and one or more node branches. In general, a root node may be used to hold the reference to the entire tree structure and to allow for grouping of sets of like rules into "rule sets" that can be executed together. This grouping of like rules together may be performed outside of the rules processing device 120 by, for example, grouping together a plurality of rules files together that perform a single operation. This may be performed by maintaining a list of root nodes that need to be executed to achieve a particular decision. For example, processing a credit application before pricing the APR may require running a base set of policy rules that generate actions that feed into an additional set of rules designed to determine APR pricing. According to some embodiments, the root node may not include any conditions or actions, but may simply serve as a default starting point for the formation of the tree structure. In some embodiments, the root note may not include any conditions, but may include one or more actions if there are some universal actions (e.g., if the minimum loan amount to finance is $4000 regardless of all other circumstances, then the root node may include such an action). According to some embodiments, each node branch of tree structure 400 may include a first-level 410 node and zero or more second-level 420 nodes. For example, as shown in FIG. 4, tree structure 400 may have a root node 402 and a first branch beginning with a first-level node 412 and including second-level nodes 422, 424, 426 and third-level nodes 432, 434, 436. Although the exemplary embodiment shown in FIG. 4 only shows one branch linked below root node 402, the branch has multiple sub-branches. For example, the branch beginning with node 412 has a first sub-branch 452 comprising three nodes 422, 432, 436, a second sub-branch 454 comprising two nodes 424, 434, and a third sub-branch 456 comprising a single node 426. The terms branch and sub-branch may be used to indicate a sub-set of linked nodes that are linked below a top node. Although the term sub-branch may generally refer to a second branch of nodes that branches off of a first branch of nodes, sub-branches may also be referred to as branches. A top node may be the first node in a branch or a sub-branch. One or more nodes linked one level below a top node may be referred to as child nodes or children. For example, as shown in FIG. 4, second-level 420 node 422 may be considered to be the top node of branch 452 and third-level 430 nodes 432, 436 may be referred to as its child nodes.

According to some embodiments, rules processing device 120 may generate tree structure (e.g., tree structure 400) based on the plurality of rules and the plurality of condition frequency counts determined at block 520. For example, according to some embodiments, rules processing device 120 may utilize a method 530 or a method 700 for generating the tree structure based on the plurality of rules and the plurality of condition frequency counts as described in greater detail with respect to FIGS. 6 and 7 below. In some embodiments, rules processing device 120 may generate tree structure 400 using an iterative process of accounting for each condition of a particular rule by checking the child nodes of a top node to see if any of the children includes the condition. If the child nodes of the top node do not include the condition-to-be-added, then rules processing device 120 may create a new child node that includes the condition-to-be-added. If one of the child nodes of the top node matches the condition-to-be-added, then rules processing device 120 may designate that child node as being the new top node and rules processing device 120 may select a second condition-to-be-added from the current rule and compare it to the child nodes of the new top node in the same manner. When the last condition of a particular rule has been accounted for (e.g., by either being added as a new child node or being identified as already being present in a node of the tree), then any actions associated with the rule are then added to the tree structure either at the node that was either newly created to include the condition or the node that was recognized to already include the condition.

According to some embodiments, each node of the tree structure 400 except the root node 412 may have a node condition and zero or more node actions. As previously state above, a root node may have no conditions, but may have zero or more association actions. Accordingly, each first-level 410 node, second-level 420 node, and third-level 430 node may have a node condition and zero or more node actions, while root node 402 has neither a condition nor an action. Although the exemplary embodiment in FIG. 4 illustrates tree structure 400 having a first-level 410, a second-level 420, and a third-level 430 of nodes, it should be understood that in some embodiments tree structure 400 may have any number of further levels of nodes beyond the third-level 430 of nodes 432, 434, 436 depicted in FIG. 4. For example, tree structure 400 generated by system 100 may have tens of levels.

In block 540, rules processing device 120 may receive an input request that includes one or more input conditions. Rules processing device 120 may receive the input request from, for example, employee terminal 128, web server 110, call center server 112, or user device 102. As described above, an input request may include data that represents a number of input conditions. For example, an input request may be a loan application that specifies or was determined to have, for example, a version of 1.00, a line of business (lob in) of 201, and a tier (i.e., tier in) of 7.

In block 550, rules processing device 120 may traverse one or more node branches of the tree structure and execute zero or more node actions in the traversed one or more node branches. In some embodiments, the traversal of the one or more node branches of the tree structure may be performed based on the input conditions. For example, as previously described above, rules processing device 120 may traverse tree structure 400 by comparing the input conditions of the input request to a condition of a node of the tree structure to determine if the condition of the node is met. If rules processing device 120 determines that the condition of a current node is not met, then rules processing device 120 may eliminate the branch or sub-branch of linked nodes below the current node from further processing. If rules processing device 120 determines that the condition of the current node is met, then rules processing device 120 may cause zero or more actions associated with the current node to be executed and may designate the sub-branch of linked nodes below the current node as requiring further processing with respect to the input request. For example, in response to traversing each node of the first-level 410 of nodes, rules processing device 120 may determine a first subset of first-level 410 nodes that have conditions that are satisfied by the input conditions of the input request and a second subset of first-level 410 nodes that have conditions that are not satisfied by the input conditions of the input request and, following the traversal of all of the first-level 410 nodes, rules processing device 120 may traverse to one or more nodes in the second-level 420 of nodes that are linked to one or more nodes of the first subset of first-level 410 nodes. Accordingly, based on the input conditions, rules processing device 120 may traverse one or more node branches of the tree structure 400 and execute zero or more node actions in the traversed one or more node branches, while eliminating node branches and sub-branches from processing that do not have a top level node that has a condition that is met by the input conditions of the input request. Rules processing device 120 may use an iterative process to traverse down each level of the tree structure in this manner.

Thus, in an exemplary embodiment where rules processing device 120 has generated tree structure 400 as shown in FIG. 4 and rules processing device 120 receives an input request specifies input conditions that include a version of 1.00, a line of business (lob in) of 201, and a tier (i.e., tier in) of 7, the traversal of tree structure 400 may begin at root node 412 and rules processing device 120 may compare the conditions of the child nodes of the root node 412 to the input conditions of the input request to determine if the child node conditions are met. Accordingly, rules processing device 120 may compare the condition of first-level node 410, which states that "version=1.00" to the input conditions and determine that the condition has been met. Accordingly, because the condition of first-level node 412 is satisfied, rules processing device 120 may cause the node actions associated with node 412 to be executed, meaning that rules processing device 120 may output that a maximum warranty of 2000 and a minimum amount to finance of 4000. After rules processing device 120 has finished traversing all of the first-level 410 nodes, rules processing device 120 may then proceed to traverse all of the second-level 420 nodes that were not in branches that were eliminated by rules processing device 120 may traverse after processing the first-level 410 nodes. For example, as shown in FIG. 4, because there is only one first-level 410 node 412 in this example and rules processing device 120 has determined that its condition has been satisfied, rules processing device 120 may proceed to traverse nodes 422, 424, and 426 to determine if their respective conditions are satisfied by the input conditions. Because the input conditions specify that the line of business is 201, rules processing device 120 may determine that the conditions of a first second-level node 422 and a second second-level node 424 have been met, but the condition of a third second-level node 426 has not been met. Accordingly, rules processing device 120 may cause the actions associated with the first and second second-level 420 nodes to execute, may designate the third-level 430 nodes 432, 434, 436 that are linked to those nodes 422, 424 for future traversal, and may eliminate the third branch 456 associated with the third second-level node 426 from further processing. Although the example shown in FIG. 4 does not show the third second-level node 426 as having any linked third-level 430 nodes, if it were to have any, rules processing device 120 would not traverse to them or process them following its elimination of the third branch 456. Rules processing device 120 may now perform a traversal of each of the third-level 430 nodes that were designated for future traversal by comparing the input conditions to the conditions of third-level nodes 432, 434, 436. Because the input conditions specify the tier is tier 7, rules processing device 120 may determine that the condition of a first third-level 430 node 432 is not met, but the conditions of a second and third third-level 430 nodes 434, 436 are met. Accordingly, rules processing device 120 may cause the node actions associated with the second and third third-level 430 nodes 434, 436 to be executed (i.e., outputting a minimum down payment of 1000 and a minimum income of 1800) while ignoring the node action of the first third-level 430 node 432.

Figure 6:
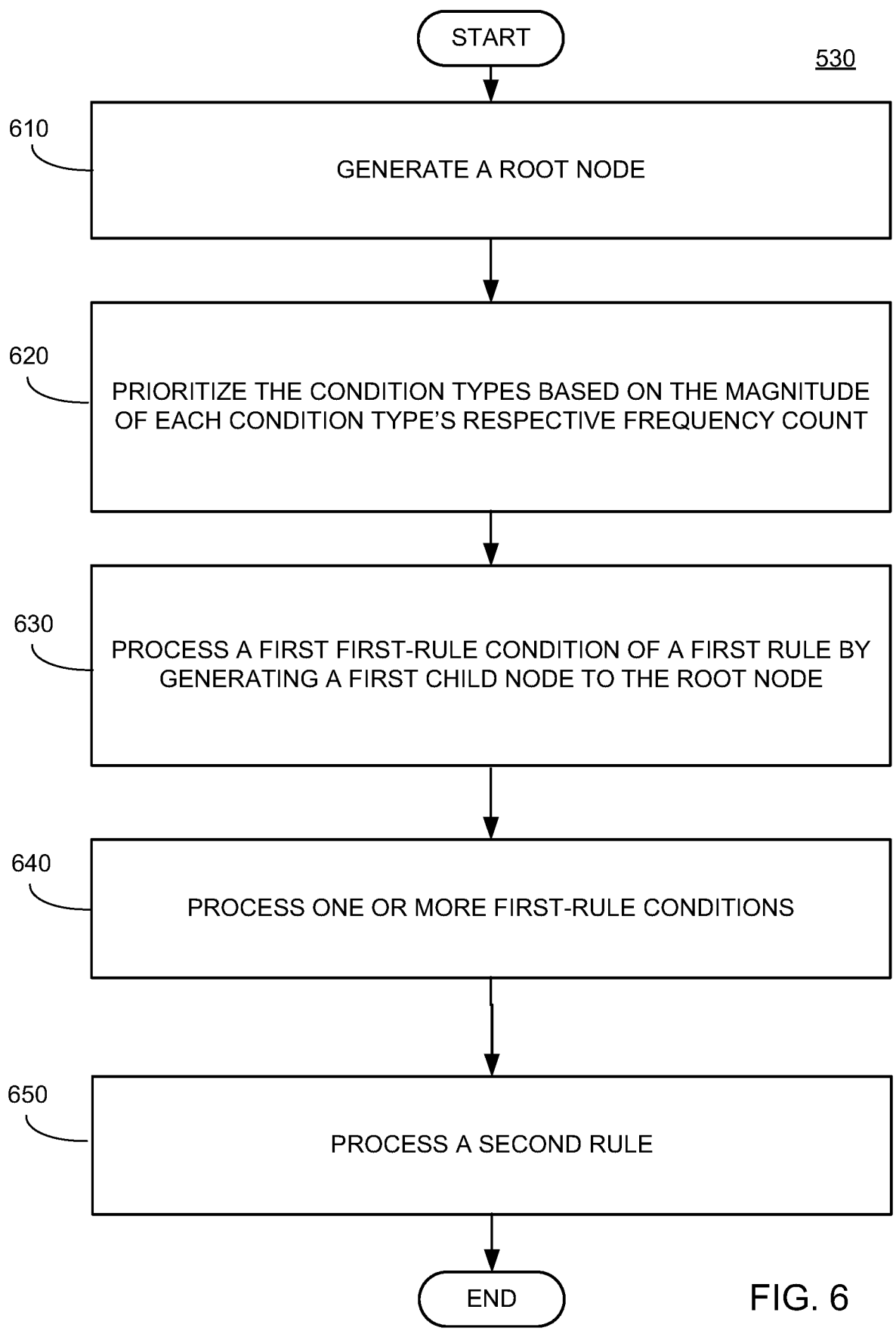
FIG. 6 is a flowchart of an exemplary system for generating a tree structure based on a plurality of rules and a plurality of condition frequency counts.

FIG. 6 shows a flowchart of an exemplary method 530 for generating tree structure, such as tree structure 400, that may be used as part of method 500 in some embodiments. In block 610, rules processing device 120 may generate a root node.

In block 620, rules processing device 120 may prioritize the condition types based on the magnitude of each condition type's respective condition frequency count. For example, rules processing device 120 may assign a priority to each condition type in descending order based on the plurality of condition frequency counts, such that the condition type having the highest condition frequency count has the highest priority and the condition frequency count having the lowest condition frequency count may have the lowest priority. According to some embodiments, if more than one condition type has the same condition frequency count, rules processing device 120 may either assign the condition types the same priority or may arbitrarily assign different priorities to each condition type having the same condition frequency count. Thus, as an example, in the FIG. 3 embodiment, condition type 308 (i.e., "Version") could have a frequency count of six, condition type 304 (i.e., "Lob in") could have a frequency count of four, and condition type 306 (i.e., "Tier in") could have a frequency count of two. The frequency count can then be used to prioritize the various condition types (e.g., 304, 306, 308) such that the condition type having the highest frequency count (i.e., condition 308) will correspond to the highest priority. In some embodiments, the method can further include sorting the various condition type columns according to their respective priorities. For example, in the FIG. 3 embodiment, the condition type columns could be resorted to be in order of (1) version condition type 308, (2) lob in condition type 304, and (3) tier in condition type 306. In some embodiments, the method may include traversing all rules of the rules file to identify rules that include the condition type having the highest priority and processing the identified set of rules first.

In block 630, rules processing device 120 may process a first first-rule condition of a first rule by generating a first child node to the root node, the first first-rule condition having a condition type of the highest priority and the first child node having the first first-rule condition. For example, in the exemplary embodiment shown in FIG. 3, rules processing device 120 may process the highest priority condition of Rule 1 (i.e., "Version=1.00") by creating a child node to the root node having this condition, as shown by node 412 in FIG. 4.

In block 640, rules processing device 120 may process one or more first-rule conditions of the first rule in order of their condition type priority by, for each first-rule condition, creating a first-rule child node including the first-rule condition, where the first-rule child node is a child node of the previously created first-rule node, and for the last processed condition, incorporating one or more actions into the last created first-rule child node. For example, in the exemplary embodiment shown in FIG. 3, after processing the highest priority condition (i.e., "Version=1.00") of Rule 1, rules processing device 120 may process the second highest priority condition (i.e., "Lob in=(201,301,350) by creating a child node to the previously created node that has this condition. In other words, as shown in FIG. 4, a child node 422 to node 412 may be created, where the child node 422 includes the second highest priority condition of Rule 1 (i.e., "Lob in=(201,301,350). The next highest priority condition of Rule 1 (i.e., "Tier in=('0', '1', '2', '3', '4', '5', '6', '7')) may then be processed by rules processing device 120 in a similar manner to generate node 432, which includes this condition and is a child node of the previously created node 422.

In block 650, rules processing device 120 may process a second rule by, responsive to determining that a first second-rule condition is not included in the first child node to the root node, generating a second child node to the root node incorporating the first second-rule condition, wherein the first second-rule condition has a condition type of the highest priority. For example, although the "Version" condition of Rule 2 shown in the exemplary embodiment in FIG. 3 is the same as the child (i.e., node 412) of the root node shown in FIG. 4, if instead the "Version" condition was, for example, "Version=1.01," then rules processing device 120 would determine that the condition is not included in the child node of the root node and it would create a new child node to the root node (not shown) that would be on the same first level 410 as the first child node 412 of the root node. This new child node may serve as the top node of a new sub-branch of nodes.

Further, rules processing device 120 may process the second rule by, responsive to determining that the first second-rule condition is included in the first child node to the root node and that a child node of the first child node to the root node does not include a second second-rule condition, creating a second-rule child node including the second-rule condition, the second-rule child node being a child of the first child node to the root node.

For example, because the "Version" condition (i.e., "Version=1.00") of Rule 2 shown in the exemplary embodiment in FIG. 3 is included in the condition of the child node (i.e., node 412) of the root node shown in FIG. 4, rules processing device 120 may determine whether the child node of the child node to the root node includes a second condition of the rule. For example, in the exemplary embodiment in FIG. 3, rules processing device 120 may determine if a second condition of Rule 2, "Lob in=(201,301,350)" is included in a child node of node 412. In this case, the second condition is included in the child node of the child node of the root node, so rules processing device 120 may take no action with respect to this condition. However, if the second condition of Rule 2 instead was "Lob in=(201,350)," then because the only child node would have been added to node 412 at this point is node 422, this condition would not be included in any child nodes of the child node of the root node, and accordingly rules processing device 120 may generate a new child node to the child node of the root node, that would, for example correspond to node 424 in FIG. 4.

According to some embodiments, after all conditions of a particular rule, (e.g., nodes 412, 422, and 432 for Rule 1) are added to the tree structure, rules processing device 120 may identifying any actions associated with the rule (e.g., action of action type 310 for Rule 1) and attached the identified action to the last node (i.e., the most-recently added node or the node identified to include the last condition of the rule) associated with the rule (i.e., node 432 for Rule 1).

As described in more with respect to FIG. 7 below, according to some embodiments, rules processing device 120 may traverse all of the rules in a rules file and either verify that each condition of a rule is already included in the tree structure or create a new node to incorporate the condition into the tree structure. In some embodiments, rules processing device 120 may presort the rules before processing them. For example, after assigning priorities to condition types as described above, rules processing device 120 may sort the rules according to the priority of their associated condition types such that the rules that include a condition of the highest condition type are first, the rules of the remaining set of rules having a condition of the condition type of the next highest priority will come next, and so on.

Figure 7:
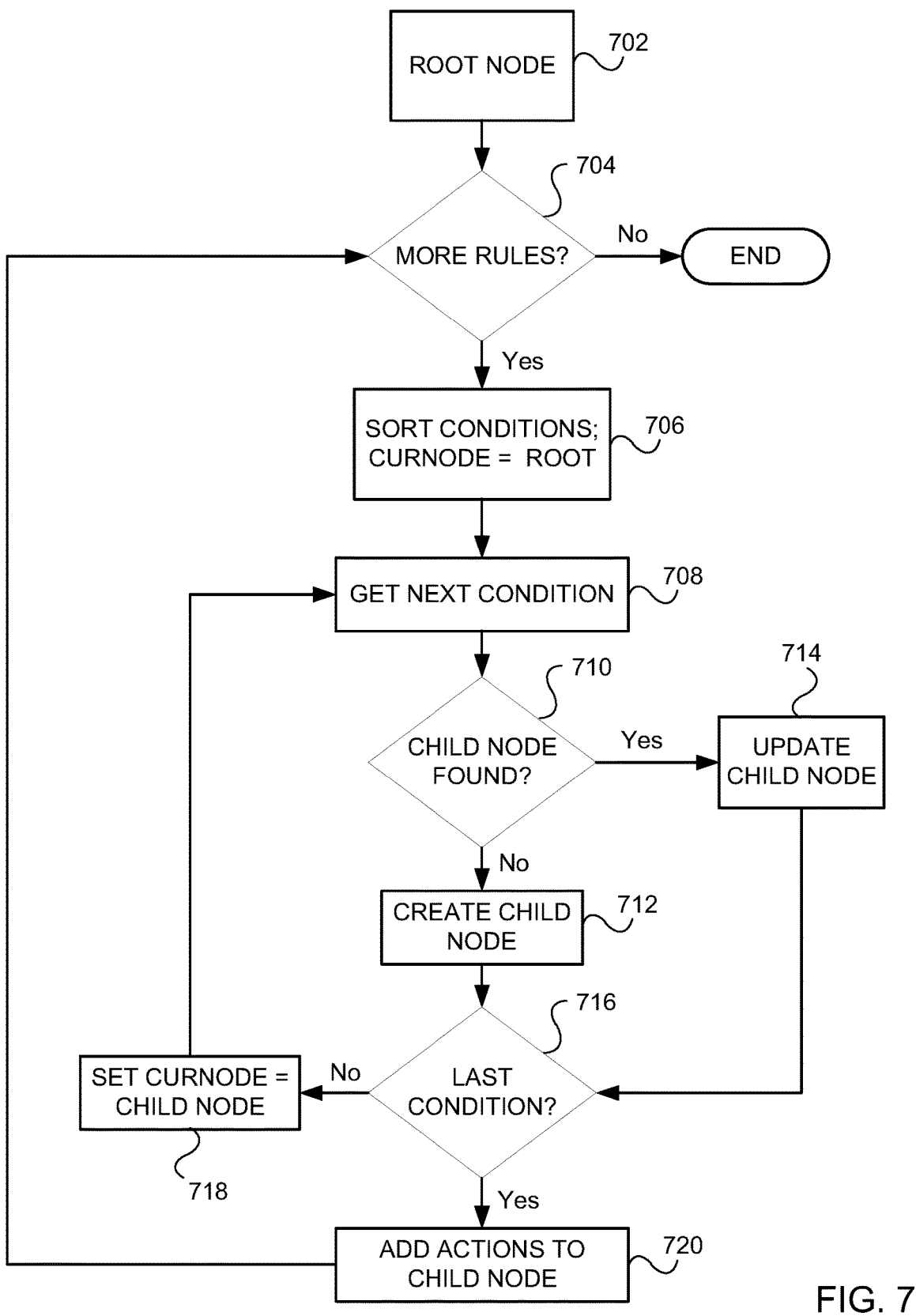
FIG. 7 is a flowchart of another exemplary system for generating a tree structure based on a plurality of rules and a plurality of condition frequency counts.

FIG. 7 illustrates a flow chart for another exemplary method 700 of generating tree structure (e.g., tree structure 400) that, according to some embodiments, may be incorporated into method 500 in place of block 530. Accordingly, method 700 may be carried out by, for example, rules processing device 120 to generate a tree structure by processing a rules file having a plurality of rules.

At block 702, rules processing device 120 may generate a root node. According to some embodiments, the root node may have no conditions and no actions, but may serve as a reference point for the beginning of a tree structure. In some embodiments, a root node may have no conditions but may have one or more actions that may be considered to be "universal actions," meaning that because there are no conditions associated with them, these actions are always triggered every time the tree structure is traversed in association with an input request or input data.

At block 704, rules processing device 120 may determine if there are any further unprocessed rules in the rules file. According to some embodiments, in response to determining there are no more unprocessed rules in the rules file, method 700 may end. In some embodiments, in response to determining that there is another unprocessed rule in the rules file, rules processing device 120 may select the next unprocessed rule for processing. For example, if no rules of the rules file have been processed, rules processing device 120 may select the first rule in the rules file for processing. If the first rule has already been processed, rules processing device 120 may select the second rule for processing, and so on.

At block 706, rules processing device 120 may sort or prioritize the conditions of the rule in descending order based on the frequency count of the condition type. For example, in the exemplary embodiment shown in FIG. 3, the "Version" condition 308 would have the first priority, the "Lob in" condition would have the second priority, and the "Tier in" condition would have the third priority. Rules processing device 120 may also set the current node to be equal to the root node. The current node may be the node in which method 700 is currently referencing in order to make decisions about adding nodes or modifying nodes in tree structure (e.g., tree structure 400). Thus, according to some embodiments, prior to adding a first condition of a new rule to the tree structure, rules processing device 120 may begin the process adding the first condition by referencing the root node (e.g., root node 402).

At block 708, rules processing device 120 may select the next condition of the current rule, based on the priority, for processing and adding to the tree structure. For example, if no conditions of the current rule have been processed, rules processing device 120 will select the highest priority condition for processing. In the exemplary embodiment shown in FIG. 3, the highest priority condition of Rule 1 is "Version=1.00." If the highest priority condition has already been processed, rules processing device 120 may select the next highest priority condition. For example, in the exemplary embodiment shown in FIG. 3, the next highest priority condition of Rule 1 is "Lob in=(201,301,350)." The currently selected condition may be referred to as the condition-to-be-added.

At block 710, rules processing device 120 may compare the condition-to-be-added to the child nodes of the current node to determine whether the condition-to-be-added is included in any of the child nodes of the current node. For example, in the exemplary embodiment shown in FIG. 3, for the first condition (i.e., "Version=1.00") of Rule 1, rules processing device 120 may search the child nodes of the root node to determine whether any of the child nodes include this condition. However, because there are not yet any child nodes of the root node, rules processing device 120 may determine that there are no child nodes of the current node that match the current condition-to-be-added.

At block 712, in response to determining that none of the child nodes of the current node include the condition-to-be-added, rules processing device 120 may create a new child node to the current node, where the new child node includes the condition-to-be-added. Accordingly, in the previous example in which the root node has no child nodes and therefore no child nodes of the root node include the first condition of the first rule, rules processing device 120 may create a new node including the condition "Version=1.00." As shown in the exemplary embodiment in FIG. 4, this newly created child node corresponds to first-level 410 node 412, which is a child node of root node 402 having the "Version=1.00" condition. According to some embodiments, following the creation of the new child node having the condition-to-be-added, method 700 may proceed to block 716.

However, if at block 712, rules processing device 120 determines that a condition-to-be-added is included in a child node of the current node, then rules processing device 120 may proceed to block 714. At block 714, rules processing device may update the child node of the current node that includes the condition-to-be-added. For example, in the exemplary embodiment shown in FIG. 3, if the condition-to-be-added is the condition "Version=1.00" of Rule 2, then rules processing device 120 may compare this condition to the child nodes of the root node and determine that node 412 includes this condition. Accordingly, rules processing device 120 may update the child node that includes the condition-to-be-added (e.g., node 412) to, for example, store the reference of the rule in the node (e.g., file name, row, rule name, etc.) and then method 700 may proceed to block 716. According to some embodiments, nodes may be updated according to this process to include a list of all of the rules that are embodied by the node to aid in debugging the program should there be any issues.

At block 716, rules processing device 120 may determine whether the previous condition-to-be-added was the last condition of the current rule or whether any unprocessed conditions remain. For example, in the exemplary embodiment shown in FIG. 3, after the highest priority condition of Rule 1 (i.e., "Version=1.00") is processed, there are still two remaining conditions of that rule that require processing (i.e., "Lob in=201,301,350" and "Tier in=('0', '1', '2', '3', '4', '5', '6')). In contrast, after processing the highest priority condition of Rule 4 (i.e., "Version=1.00") of the exemplary embodiment of FIG. 3, there are no more conditions to be processed in that rule. If rules processing device 120 determines that the previous condition-to-be-added is not the last condition of the current rule that requires processing, method 700 may advance to block 718, otherwise method 700 may advance to block 720.

At block 718, rules processing device may set the current node to be one of either the child node created at block 712 or the child node that was updated at block 714, based on whether the child node was found at block 710 or not. In other words, if no child node was found to include the condition-to-be-added in block 710, then at block 718 the current node will be set to be the new child node created at block 712, however if a child node was found to include the condition-to-be-added at block 710, then at block 718 the current node will be set to be the child node that was updated at block 714. After updating the current node, method 700 may proceed to block 708 to obtain the next condition of the current rule that has not yet been processed.

At block 720, following a determination that the previous condition-to-be-added was the last condition of the current rule, rules processing device may add the actions associated with the current rule to one of either the child node created at block 712 or the child node that was updated at block 714, based on whether the child node was found at block 710 or not.

In other words, if no child node was found to include the condition-to-be-added in block 710, then at block 720, rules processing device 120 may add the actions of the condition-to-be-added to the new child node created at block 712, however if a child node was found to include the condition-to-be-added at block 710, then at block 720 rules processing device 120 may add the actions of the condition-to-be-added to the child node that was updated at block 714. In other words, according to some embodiments, the actions of a rule may be added to a node of the tree structure after the last condition of the rule is accounted for by either determining the condition already exists in the tree structure, or by adding a new node to the tree structure that includes the last condition of the rule. For example, in the exemplary embodiment shown in FIG. 3, after the "Version=1.00" and the "Lob in=(201,301,350) conditions of Rule 1 have been added to the tree structure, resulting in the creation of node 412 and node 422 shown in FIG. 4, the last condition of Rule 1, "Tier in=('0', '1', '2', '3', '4', '5', '6')," is added to create node 432 and the action associated with the rule (i.e., "minIncome=1500") is then added to node 432, as shown in FIG. 4. Following the addition of the actions to the child node, method 700 may advance to block 704 to then process the next rule of the rules file, if any.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A company or organization (e.g., a financial service provider) may generate and maintain a large volume of rules that are used to process loan applications. If all of the conditions of a particular rule are met, then the rule may trigger various actions to be taken by the company. Since there may be large volume of rules (e.g., millions), computing systems are often used to process the loan applications against the rules. However, the rules may be ever changing based on various business considerations and so it is desirable to enable company employees who are untrained in the computing programming be able to edit the rules without requiring them to access the code of the rules processing engine. Accordingly, the system (e.g., system 100) may separately maintain a rules file (e.g., via rules storage device 122) from the rules processing engine (e.g., rules processing device 120) that can be accessed (e.g., via employee terminal 128) and edited by employees.

For example, the rules file may be stored in cloud storage (e.g., via third party server 126) that may be accessed by one or more employees (e.g., via employee terminal 128) via the internet. Once the employees have finalized a version of the rules file by updating all of the rules as desired, the rules engine (e.g., rules processing device 120) may receive the rules file (e.g., via rules storage device 122) and compile the rules into a tree structure that may be used to process an incoming loan application. Many different tree structures may be created in this fashion and may be used in concert, with outputs of one or more tree structures feeding into one or more other trees structures as inputs. A customer may submit a loan application to the company (e.g., via user device 102) and the loan application may be sent to the rules engine for processing (e.g., via rules processing device 120). Upon receiving the loan application, the rules engine may input data from the loan application into one or more tree structures and the one or more tree structures may apply the large volumes of rules that are embodied in the tree structure(s) to the input data to generate outputs. For example, a tree structure representing a set of base credit policy rules may first determine if the applicant is qualified to receive a loan. If the output of that tree structure represents that the applicant does qualify for a loan, then one or more outputs of that tree structure may be fed into a second tree structure that may determine the APR rates for the loan. A third three structure may then determine a set of fees or rate adjustments to the loan offer. Each tree structure may be repeatedly used for its particular purpose once it is generated from an associated rules file. If the rules file for any particular tree structure is updated, then that tree structure may also be updated by rebuilding the tree structure from the updated rules fileFollowing the processing of the loan application using the tree structure(s), the system (e.g., via rules processing device 120) may generate a series of outputs, such as, for example, a series of requirements or features of the loan such as a minimum income, a minimum amount to be financed, a minimum down payment, an APR, fees, and the like. Some or all of these outputs may then be transmitted to an employee (e.g., via employee terminal 128) and/or to the customer (e.g., via web server 110) for display. Some or all of the outputs may also be stored or further processing by the system (e.g., system 100) to generate further output data. For example, a tree structure may be used to determine an interest rate for an application for a vehicle loan and the output map may include an interest rate that is output for further processing by the system to determine, for example, a monthly payment, dealer fees, or other such outputs that may be determined using the outputs of the tree structure. After a loan application is processed by the tree structure(s), one or more outputs (e.g., maximum amount to finance, minimum amount to finance, maximum payment, maximum warranty, minimum down payment, maximum vehicle age, maximum vehicle mileage, etc.) of the tree structure(s) may be compared to the values of the policies offered by the company to determine whether the application should be approved or denied.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for generating a data tree structure for expediting rule-based decision-making, the system comprising:
   one or more processors; and
   a memory in communication with the one or more processors and storing instructions that, when executed by the one or more processors, are configured to cause the system to:
      receive a rules file comprising a plurality of rules, each rule of the plurality of rules comprising one or more conditions and one or more actions, wherein each condition is associated with a condition type;

responsive to reading the rules file, generate a plurality of condition frequency counts, each of the plurality of condition frequency counts being associated with a unique condition type, and each condition frequency count representing the total number of rules having a condition associated with the respective unique condition type;

generate, based on the plurality of rules and the plurality of condition frequency counts, the data tree structure comprising a root node and one or more node branches, each node branch comprising a first-level node and one or more second-level nodes, each of the first-level nodes and the one or more second-level nodes having a node condition and at least some of the first-level nodes and second-level nodes having one or more node actions;

receive an input request comprising one or more input conditions;

based on the one or more input conditions, traverse each first-level node of the one or more node branches;

determine a subset of the first-level nodes having conditions that are satisfied by one or more input conditions of the input request;

traverse to each second-level node of the one or more node branches that is linked to a node of the subset of first-level nodes, bypassing each second-level node of the one or more node branches that is not linked to a node of the subset of first-level nodes; and execute one or more node actions associated with at least some of the traversed nodes.

2. The system of claim 1, the memory storing further instructions that, when executed by the one or more processors, are further configured to cause the system to:

identify a sub-group of traversed nodes, wherein each traversed node of the sub-group has a condition that is met by the one or more input conditions of the input request; and execute the one or more node actions associated with at least some traversed nodes of the sub-group of traversed nodes.

3. The system of claim 1, wherein at least one first-level node is formed from one rule.

4. The system of claim 1, wherein at least one first-level node is formed from two rules.

5. The system of claim 1, wherein the data tree structure is a hierarchy of singly linked nodes.

6. The system of claim 2, wherein one or more of the node actions have a respective associated priority, and wherein the instructions, when executed by the one or more processors, are further configured to cause the system to, responsive to determining that two or more of the node actions associated with the sub-group conflict with one another, prioritize execution of the two or more conflicting node actions based on their respective associated priorities.

7. The system of claim 1, wherein the condition types comprise one or more of line-of-business in, tier in, and version.

8. The system of claim 1, wherein generating the data tree structure based on the plurality of rules and the plurality of condition frequency counts comprises:

generating a root node;

prioritizing the condition types based on the magnitude of each condition type's respective frequency count;

processing a first first-rule condition of a first rule by generating a first child node to the root node, the first first-rule condition having a condition type of the highest priority and the first child node having the first first-rule condition;

processing one or more first-rule conditions of the first rule in order of their condition type priority by, for each first-rule condition, creating a first-rule child node including the first-rule condition, where the first-rule child node is a child node of the previously created first-rule node, and for the last processed condition, incorporating one or more actions into the last created first-rule child node; and processing a second rule by:

responsive to determining that a first second-rule condition is not included in the first child node to the root node, generating a second child node to the root node incorporating the first second-rule condition, wherein the first second-rule condition has a condition type of the highest priority;

responsive to determining that the first second-rule condition is included in the first child node to the root node and that a child node of the first child node to the root node does not include a second second-rule condition, creating a second-rule child node including the second-rule condition, the second-rule child node being a child of the first child node to the root node.

9. A computer-implemented method for generating a data tree structure to be used for expediting rule-based decision-making, the method comprising:

receiving a rules file comprising a plurality of rules, each rule of the plurality of rules comprising one or more conditions and one or more actions, wherein each condition is associated with a condition type;

responsive to reading the rules file, generating a plurality of condition frequency counts, each of the plurality of condition frequency counts being associated with a unique condition type, and each condition frequency count representing the total number of rules having a condition associated with the respective unique condition type;

generating, based on the plurality of rules and the plurality of condition frequency counts, the data tree structure comprising a root node and one or more node branches, each node branch comprising a first-level node and one or more second-level nodes, each of the first-level nodes and the one or more second-level nodes having a node condition and at least some of the first-level nodes and second-level nodes having one or more node actions;

receiving an input request comprising one or more input conditions;

based on the input conditions, traverse each first-level node of the one or more node branches;

determine a subset of the first-level nodes having conditions that are satisfied by one or more input conditions of the input request;

traverse to each second-level node of the one or more node branches that is linked to a node of the subset of first-level nodes, bypassing each second-level node of the one or more node branches that is not linked to a node of the subset of first-level nodes; and execute one or more node actions associated with at least some of the traversed nodes.

10. The method of claim 9, further comprising:
identifying a sub-group of traversed nodes, wherein each traversed node of the sub-group includes a condition that is met by the one or more input conditions of the input request; and
executing the one or more node actions associated with at least some traversed nodes of the sub-group of traversed nodes.

11. The method of claim 9, wherein at least one first-level node is formed from one rule.

12. The method of claim 9, wherein at least one first-level node is formed from two rules.

13. A non-transitory computer-readable medium storing instructions for generating a data tree structure to be used for expediting rule-based decision-making that, when executed by one or more processors, cause a system to:
receive a rules file comprising a plurality of rules, each rule of the plurality of rules comprising one or more conditions and one or more actions, wherein each condition is associated with a condition type;
responsive to reading the rules file, generate a plurality of condition frequency counts, each of the plurality of condition frequency counts being associated with a unique condition type, and each condition frequency count representing the total number of rules having a condition associated with the respective unique condition type;
generate, based on the plurality of rules and the plurality of condition frequency counts, the data tree structure comprising a root node and one or more node branches, each node branch comprising a first-level node and one or more second-level nodes, each of the first-level nodes and the one or more second-level nodes having a node condition and at least some of the first-level nodes and second-level nodes having one or more node actions;
receive an input request comprising one or more input conditions;
based on the one or more input conditions, traverse each first-level node of the one or more node branches;
determine a subset of the first-level nodes having conditions that are satisfied by one or more input conditions of the input request;
traverse to each second-level node of the one or more node branches that is linked to a node of the subset of first-level nodes, bypassing each second-level node of the one or more node branches that is not linked to a node of the subset of first-level nodes; and
execute one or more node actions associated with at least some of the traversed nodes.

14. The non-transitory computer-readable medium of claim 13, wherein the data tree structure is a hierarchy of singly linked nodes.

15. The non-transitory computer-readable medium of claim 13, wherein condition types comprise one or more of line-of-business in, tier in, and version.

* * * * *